(12) United States Patent
Boudreaux

(10) Patent No.: US 11,006,793 B1
(45) Date of Patent: May 18, 2021

(54) PORTABLE TOILET

(71) Applicant: Chad Boudreaux, Cut Off, LA (US)

(72) Inventor: Chad Boudreaux, Cut Off, LA (US)

( * ) Notice: Subject to any disclaimer, the term of this patent is extended or adjusted under 35 U.S.C. 154(b) by 0 days.

(21) Appl. No.: 16/399,475

(22) Filed: Apr. 30, 2019

Related U.S. Application Data

(60) Provisional application No. 62/664,610, filed on Apr. 30, 2018.

(51) Int. Cl.
*A47K 11/02* (2006.01)

(52) U.S. Cl.
CPC .................................. *A47K 11/02* (2013.01)

(58) Field of Classification Search
CPC ....... E04H 1/14; E04H 1/1216; E04H 1/1244; E04H 1/1261; E04H 1/1266; E04H 1/1277; E04H 2001/1283; E04H 2001/1288; A47K 11/02; Y10T 292/1043; Y10T 292/1077; Y10T 292/108; Y10T 292/34; Y10T 292/391; Y10T 292/68; Y10T 292/71; Y10T 292/73; Y10S 292/29; Y10S 292/71
See application file for complete search history.

(56) References Cited

U.S. PATENT DOCUMENTS

| | | | | |
|---|---|---|---|---|
| 888,364 A * | 5/1908 | Stotz | ................... | E05B 65/0841 292/241 |
| 1,329,453 A * | 2/1920 | Bohn | ..................... | F25D 23/02 49/401 |
| 3,074,076 A * | 1/1963 | Kersten | .................. | E04H 1/1216 4/459 |
| 3,601,821 A * | 8/1971 | Corsiglia | .................. | E03D 7/00 4/300 |
| 4,065,885 A * | 1/1978 | Blick, III | .............. | E04H 1/1216 4/460 |
| 5,500,962 A * | 3/1996 | Tagg | ..................... | E04H 1/1216 4/449 |
| 7,437,854 B1 * | 10/2008 | O'Reilly | ............... | E04H 1/1216 52/27 |
| 7,726,496 B2 * | 6/2010 | Heinrichs | ............ | B65D 88/129 211/191 |
| 9,771,730 B2 * | 9/2017 | Matejka | .................. | B60P 1/286 |
| 2014/0215702 A1 * | 8/2014 | Ito | .......................... | E04H 1/1266 4/321 |

\* cited by examiner

*Primary Examiner* — Erin Deery
(74) *Attorney, Agent, or Firm* — Jones Walker LLP

(57) ABSTRACT

A portable assembly for housing a toilet having an enclosure having a doorframe cutout having a first perimeter portion formed around the doorframe cutout, the first perimeter portion comprises a knife edge extending out from an outer side of the front sidewall. The portable assembly further includes a door having a second perimeter being sized and shaped to substantially correspond to a shape and a size of the doorframe cutout, a gasket fit inside of a cavity in the door, wherein the gasket comprises a divot sized and shaped to correspond a shape and a size of the knife edge to accommodate the knife edge when the door is configured in the closed position, and a lock assembly configured to engage a wedge to provide a knife-edge seal via the gasket and knife edge.

28 Claims, 3 Drawing Sheets

PORTABLE TOILET

CROSS-REFERENCE TO RELATED APPLICATIONS

This application claims the benefit of and priority to U.S. Provisional Patent Application No. 62/664,610 filed on Apr. 30, 2018, which is incorporated herein by reference.

BACKGROUND

In the offshore oil & gas industry, portable toilets are oftentimes transported on and off of the drilling platform using a crane. The portable toilets can then be positioned on the deck of the drilling platform using a forklift. To facilitate this type of transport, the traditional plastic portable toilets have to be placed into a temporary "cage" to allow for the transport via a crane and cables.

In practice, the traditional plastic portable toilets—even when placed into a temporary cage—present several drawbacks. By the very nature of transportation via a crane, the portable toilet oftentimes sways during the loading and unloading process. Traditional portable toilets constructed of plastic feature flimsy doors which cannot maintain watertight seal. Thus, during the loading and unloading process, sewage and other chemicals can escape the primary waste reservoir and leak out of the enclosure's plastic door, thus presenting an environmental hazard. Additionally, traditional plastic portable toilets are prone to being punctured by the forks of the forklift during transportation on the deck of the drilling platform, thus damaging the portable toilet.

The disclosure addresses these drawbacks of traditional plastic portable toilets.

SUMMARY

The disclosure disclosed herein is directed to a portable assembly for housing a toilet, which may be used in the offshore oil & gas industry and in other industries. The portable assembly may include an enclosure including a right sidewall, a left sidewall, a front sidewall, a rear sidewall, and a top sidewall, the front sidewall having a doorframe cutout having a first perimeter portion formed around the doorframe cutout, wherein the first perimeter portion includes a knife edge extending out from an outer side of the front sidewall. The portable assembly may include a base assembly, wherein the base assembly is coupled to the right sidewall, a left sidewall, a front sidewall, and a rear sidewall. The portable assembly may include a door having a second perimeter being sized and shaped to substantially correspond to a shape and a size of the doorframe cutout, the door having an inner side and an outer side, the second perimeter having a cavity formed in the second perimeter, wherein an opening of the cavity faces out from the inner side of the door, the inner side of the door being configured to substantially cover the doorframe cutout when the door is configured in a closed position. The portable assembly may include a gasket sized and shaped to substantially correspond to the shape and size of the cavity allowing the gasket to fit flush inside of the cavity, wherein the gasket includes a divot sized and shaped to correspond a shape and a size of the knife edge to accommodate the knife edge when the door is configured in the closed position. The portable assembly may include a wedge having a first side attached to an inner side of the front wall, the wedge extending out from the inner side of the front wall. The portable assembly may include a lock assembly attached to the door, the lock assembly including: a bolt extending through the door, wherein a first portion of the bolt extends from the outer side of the door and a second portion of the bolt extends from the inner side of the door, the bolt being rotatable about an axis; a first lever attached to the first portion of the bolt and configured to rotate about the axis; and a second lever attached to the second portion of the bolt, the second lever having a first surface configured to rotate about the axis to engage a sloped second side of the wedge for configuring the door in the closed position and in an opened position, wherein the second lever engages a thicker portion of the wedge in the closed position, wherein the engagement of the first surface of the second lever and the sloped second side of the wedge provides a knife-edge seal via the gasket and knife edge.

In one or more embodiments, the portable assembly may further include a hinge coupling an edge of the door to the front side of the enclosure, wherein the door is configured to swing about the hinge.

In one or more embodiments, a narrow portion of the wedge is oriented spatially closer to the base assembly than the thicker portion of the wedge.

In one or more embodiments, the thicker portion of the wedge is oriented spatially closer to the base assembly than a narrow portion of the wedge.

In one or more embodiments, responsive to transitioning from the open position to the closed position, the first surface of the second lever initially engages with a narrow portion of the wedge and slides along the sloped second side of the wedge to the thicker portion of the wedge.

In one or more embodiments, the second lever is a bilateral lever having a first arm extending in a first lateral direction from the bolt and a second arm extending in a second lateral direction from the bolt.

In one or more embodiments, the second lateral direction is substantially opposite to the first lateral direction.

In one or more embodiments, the portable assembly further includes the toilet disposed on a top side of the base assembly and within the enclosure.

In one or more embodiments, the gasket is rubber.

In one or more embodiments, the wedge is integrally formed with the front side of the enclosure.

In one or more embodiments, the gasket extends around an entire length of the cavity.

In one or more embodiments, the portable assembly further includes one or more hooking devices attached to the enclosure.

In one or more embodiments, the one or more hooking devices is attached to the top side wall.

In one or more embodiments, each of the hooking devices includes pad eyes.

In one or more embodiments, the one or more hooking devices includes four hooking devices located at top corners of the enclosure.

In one or more embodiments, the base assembly is integrally formed with the enclosure.

In one or more embodiments, the base assembly forms a floor of the enclosure.

In one or more embodiments, the base assembly extends beyond a length of enclosure.

In one or more embodiments, the base assembly includes one or more pocket channels, each pocket channel having at least one open end.

In one or more embodiments, each pocket channel includes two open ends.

In one or more embodiments, each pocket channel includes an opening extending an entire length of the corresponding pocket channel between the two open ends.

In one or more embodiments, the base assembly includes two pocket channels.

In one or more embodiments, an outer edge of a first of the two pocket channels is substantially aligned with an outer edge of the right sidewall, and an outer edge of a second of the two pocket channels is substantially aligned with an outer edge of the right sidewall.

In one or more embodiments, an outer edge of a first of the two pocket channels is substantially aligned with an outer edge of the front sidewall, and an outer edge of a second of the two pocket channels is substantially aligned with an outer edge of the rear sidewall.

In one or more embodiments, junctions between adjacent sidewalls of the enclosure form substantially 90 degree angles.

In one or more embodiments, the knife-edge seal is a water-tight seal.

In one or more embodiments, an angle formed between the first side of the wedge and the sloped second side of the wedge is between about 5 to 15 degrees.

The disclosure also relates to a method for transporting the portable assembly describe above, where the method includes transporting the portable assembly from a first location to a second location.

In one or more embodiments, the method further includes transporting the portable assembly when the door is configured in the closed position.

In one or more embodiments, the portable assembly further includes the toilet disposed on a top side of the base assembly and within the enclosure, and the method further includes transporting the portable assembly and the toilet from the first location to a second location.

In one or more embodiments, the portable assembly further includes one or more hooking devices attached to the enclosure, and the method further includes transporting the portable assembly via the one or more hooking devices.

In one or more embodiments, the portable assembly is transported via a crane.

In one or more embodiments, transporting includes transporting the portable assembly to a drilling platform.

In one or more embodiments, transporting includes transporting the portable assembly from a first location on a drilling platform to a second location on the drilling platform.

In one or more embodiments, transporting includes transporting the portable assembly from a drilling platform.

In one or more embodiments, the base assembly includes one or more pocket channels, each pocket channel having at least one open end, and the method further includes transporting the portable assembly via the one or more pocket channels.

In one or more embodiments, the portable assembly is transported via a forklift.

The above summary is not intended to describe each illustrated embodiment or every possible implementation. These and other features, aspects, and advantages of the present invention will become better understood with regard to the following description, appended claims, and accompanying drawings.

DETAILED DESCRIPTION OF THE DISCLOSURE

Figure 1:
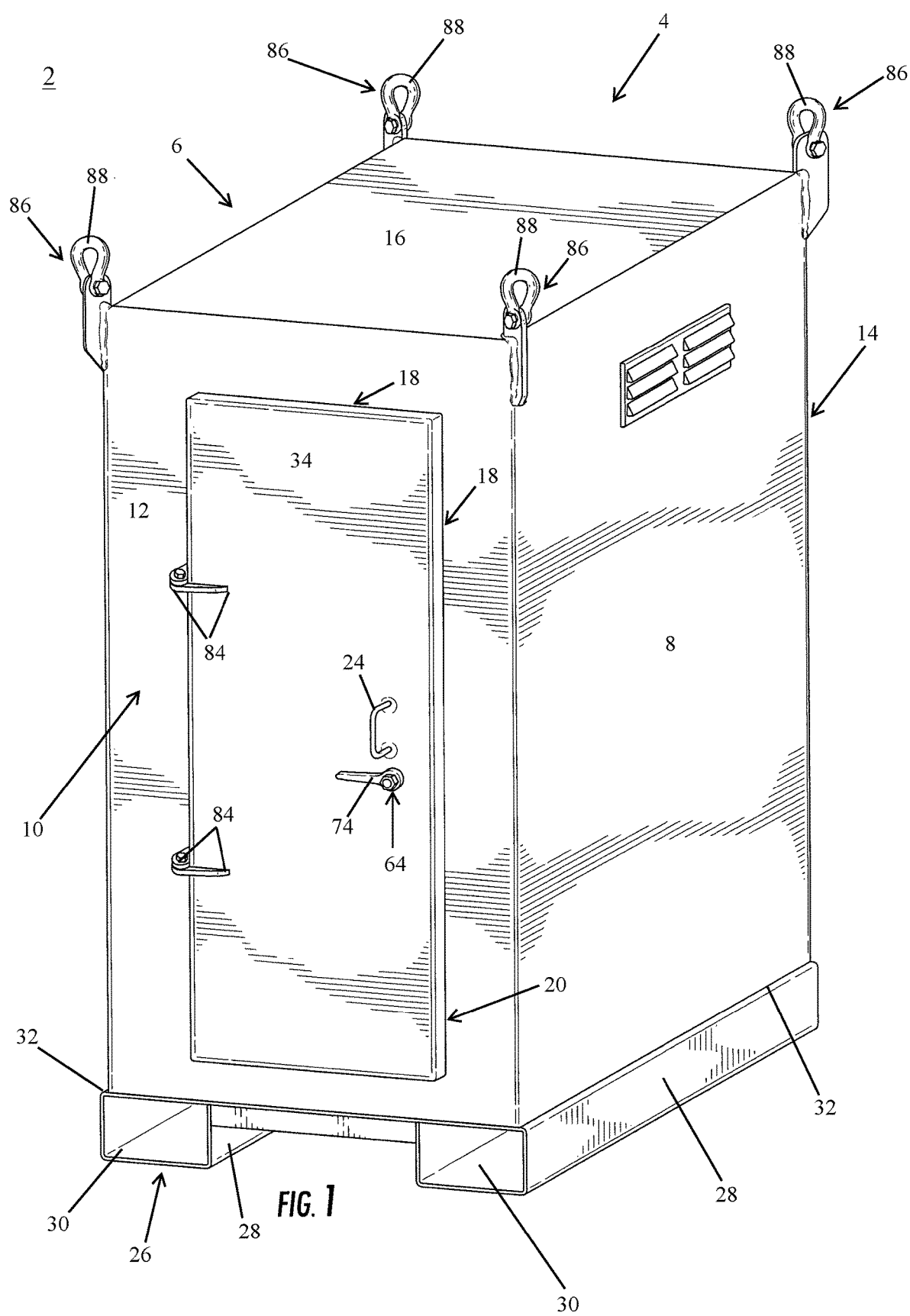
FIG. 1 is a perspective view of an embodiment of the portable assembly.

With reference to the figures where like elements have been given like numerical designation to facilitate an understanding of the present disclosure, and particularly with reference to the embodiment of the portable assembly for housing a toilet illustrated in FIGS. 1-5, the portable assembly 2 may be constructed for transport, such as via a forklift, a crane, and the like. The portable assembly 2 may include an enclosure 4, a base assembly 26, door 34, and one or more hooking devices 86.

Figure 2:
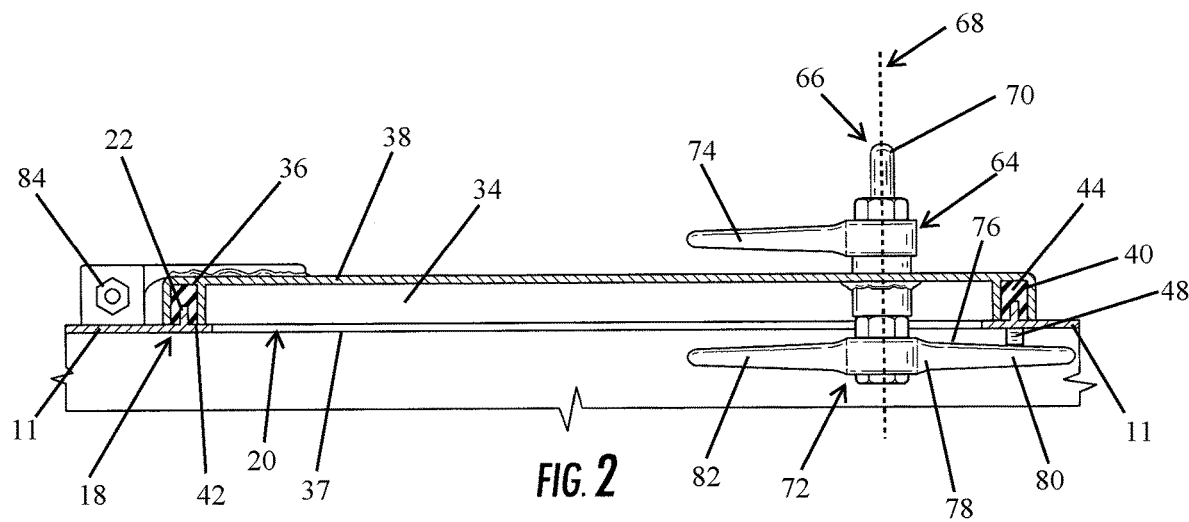
FIG. 2 is a top cross-sectional view of an embodiment of the portable assembly.
Figure 3:
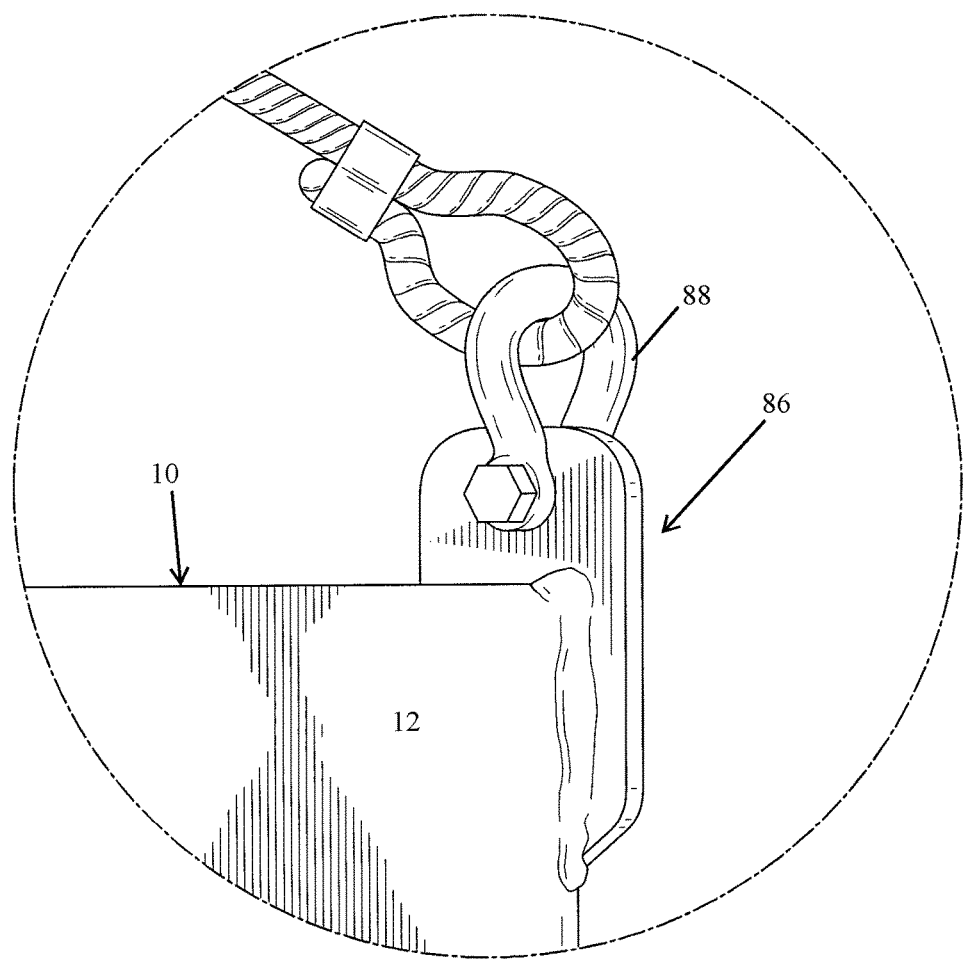
FIG. 3 is a perspective view of an embodiment of the portable assembly.
Figure 4:
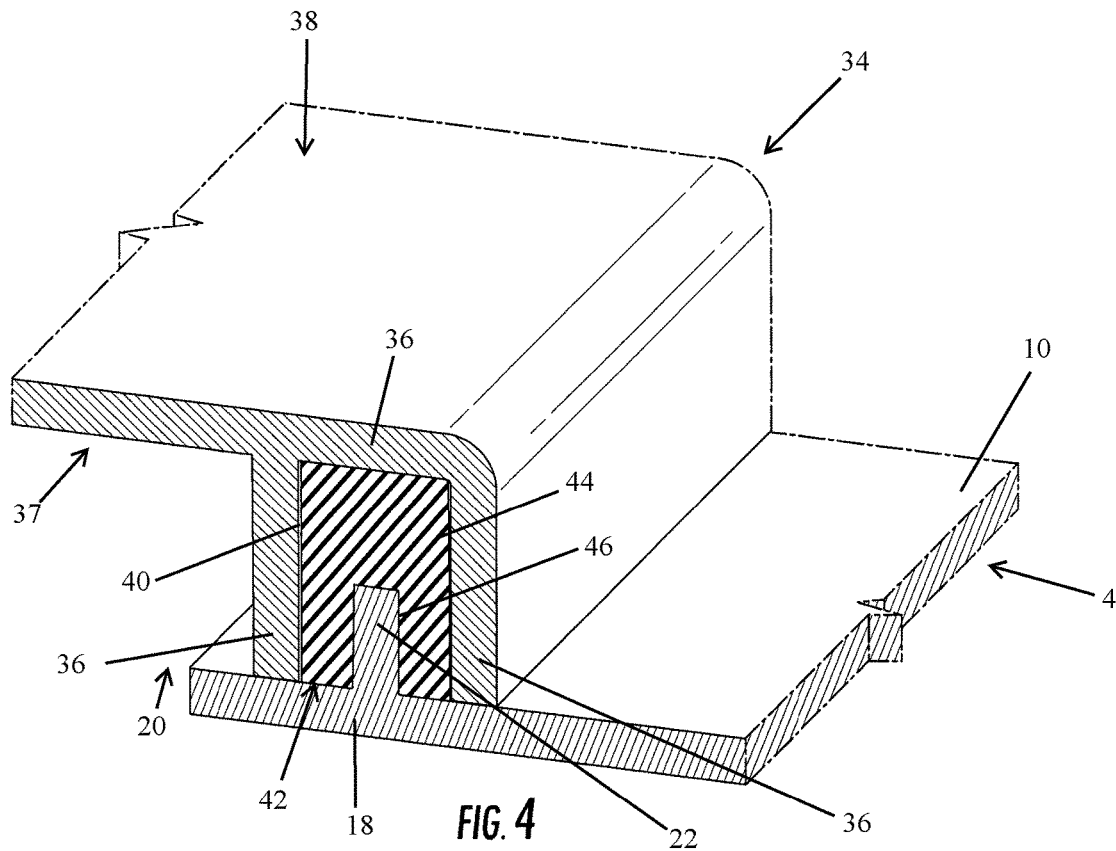
FIG. 4 is a cross-sectional view of an embodiment of the portable assembly.
Figure 5:
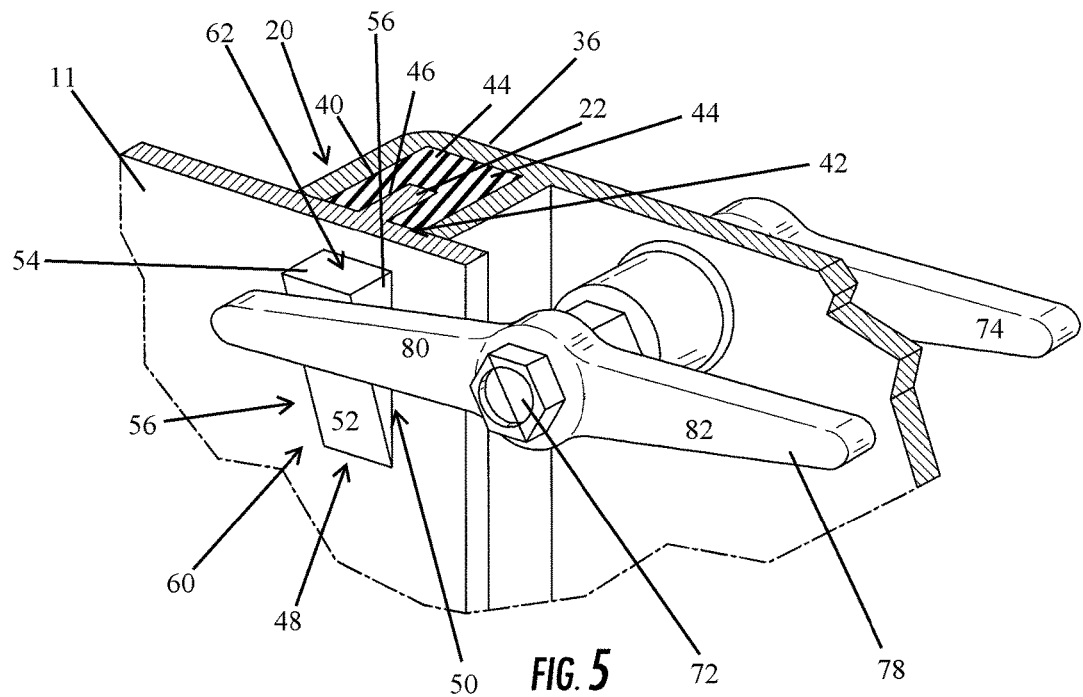
FIG. 5 is a cross-sectional view of an embodiment of the portable assembly.

The enclosure 4 may be coupled to (e.g., fixedly attached, mounted, etc.) to a base assembly 26. The enclosure 4 and base assembly 26 are preferably constructed out of a metal, such as aluminum, steel, and the like. The enclosure 4 may comprise a right sidewall 6, a left sidewall 8, a front sidewall 10, a rear sidewall 14, and a top sidewall 16, which may be a ceiling, any of which may be welded together for example. In some embodiments, the right sidewall 6 and left sidewall 8 may measure about 40-50 inches in length (e.g., 45 inches). In some embodiments, the front sidewall 10 and the rear sidewall 14 may measure about 45-55 inches in length (e.g., 47 inches). The sidewalls 6, 8, 10, 14, and 16 may be about ¼ to 1 inch thick (e.g., 3/16 inches). An angle formed between adjacent sidewalls 6, 8, 10, 14, and 16 may be about 90 degrees. The enclosure 4 may include a doorframe 18 forming a perimeter portion around a doorframe cutout 20. As shown in FIGS. 2, 4, and 5, the doorframe cutout 20 may include a knife edge flange 22 (typically referred to below as simply "knife edge"), which may extend out away from the outer side 12 of the front side wall 10. The knife edge 22 may be about ⅜ inches in length.

In some embodiments, enclosure 4 may further comprise a floor attached to the right, left, front, and rear sidewalls 6, 8, 10, 14. In some embodiments, the base assembly 26 may be the floor of the enclosure 4. A toilet may be disposed on a top side of the base assembly 26 (floor) and within the enclosure 4. The floor may be about ¼ to 1 inch thick (e.g., 3/16 inches). The enclosure 4 can be attached to the base assembly 26 via welding, bolts, or any other means known in the art. In some embodiments, base assembly 26 may be integrally formed with the enclosure 4, such as during the manufacturing of the portable assembly 2. In some embodiments, base assembly 26 may fit flush with the bottom edge of sidewalls 6, 8, 10, 14 of the enclosure 4, forming a rectangular or square shape or cross section. In some embodiments, the base assembly 26 may extend beyond the length of the enclosure 4, such as to form a step and/or platform in front of one of the sidewalls 6, 8, 10, 14 of the enclosure 4. For example, a platform may be formed in front of the door 34.

Base assembly 26 may include one or more pocket channels 28, which each may have one or more open ends 30. For example, base assembly 26 may include two pocket channels 28 formed at opposite ends of the base assembly 26, such as on the underside of enclosure 4. The pocket channels 28 may measure about 4 to 8 inches in height (e.g., 6 inches) and may be about 8 to 16 inches in width (e.g., 12 inches). Portable assembly 2 may be lifted and/or transported via the one or more pocket channels 28. For example, a person or machine, such as a forklift, may lift the portable assembly 2 may inserting a lifting member into the open end 30 and lifting the portable assembly 2. In this arrangement, the portable assembly 2 can be transported via a forklift without the risk of the enclosure 4 being damaged. In some embodiments, pocket channel 28 may include an opening extending through the entire length of the pocket channel 28 between two open ends 30. In some embodiments, an outer edge 32 of one pocket channel 28 may be aligned with an outer edge of right side wall 6, and an outer edge 32 of a second pocket channel 28 may be aligned with an outer edge of left sidewall 8. In some embodiments, an outer edge 32 of one pocket channel 28 may be aligned with an outer edge of front side wall 10, and an outer edge 32 of a second pocket channel 28 may be aligned with an outer edge of rear sidewall 14.

The enclosure 4 of the portable assembly 2 may include or more hooking devices 86 (e.g., hoops, hooks, etc.) mounted to the portable assembly 2, such as to one or more of the sidewalls 6, 8, 10, 14, 16 of the enclosure 4 (e.g., to the ceiling, top sidewall 16, or to a junction of two or three sidewalls 6, 8, 10, 14, 16). Hooking devices 86 may allow the portable assembly 2 to be transported via a wire and/or crane (or other device), without the need to use a separate cage as is used in conventional systems. In some embodiments, a hooking device 86 may extend up from the enclosure of the enclosure 4. In some embodiments, the one or more hooking devices 86 may attach to a sidewall (right sidewall 6, a left sidewall 8, a front sidewall 10, and a rear sidewall 14) in addition to or instead of attaching to the top side wall 16. In some embodiments, a hooking device 86 may include or be a pad eye 88 and/or an extension portion attached to a loop. In one embodiment, the portable assembly 2 may include four (4) pad eyes 88 mounted at the top corners of the portable assembly 2, such as shown in the figures.

The enclosure 4 may include a wedge 48 having a first side 50 attached to the front wall 10, such as at about a midway length point near a longer side of the front wall 10. The handle 24 may be located near the wedge on the opposite side of the front sidewall 10. The wedge 48 may extend out from the inner side 11 of the front sidewall 10. The wedge 48 may include second side 52, third side 54, and fourth sides 56. The wedge 48 may include a narrow portion 60 and a thicker portion 62, which may have a greater width than the narrow portion 60. The thicker portion 62 may be on the end closer to the third side 54. The second side 52 may be sloped from the narrow portion 60 to the thicker portion 62. In some embodiments, the narrow portion 60 may be located and/or oriented spatially closer to the base assembly 26 than the thicker portion 62. In some embodiments, the thicker portion 62 may be located and/or oriented spatially closer to the base assembly 26 than the narrow portion 60. In some embodiments, an angle formed between the first side 50 of the wedge 48 and the sloped second side 52 of the wedge 48 may be between about 5 to 15 degrees (e.g., 10 degrees). In some embodiments, the wedge 48 may be integrally formed with the enclosure 4.

The enclosure 4 may include a marine-style watertight door 34 formed in and/or attached to the front sidewall 10 of the enclosure 4. For example, an edge of the door 34 may attach to the front wall 10 of the enclosure 4 via one or more hinges 84, which may allow the door 34 to swing about the one or more hinges 84. The door 34 may measure about 66 to 80 inches in height (e.g., 71 inches). As shown, the height of a lower hinge 84 may be about 18 inches from the bottom of the door 34, and the height of the upper hinge 84 may be about 36 inches from the bottom of the door 34. The door 34 may be about ¼ to 1 inch thick (e.g., 3/16 inches). The door 34 may include an inner side 37 and an outer side 38. The door 34 may include a perimeter portion 36 being sized and shape to substantially correspond to the size and shape of the perimeter of the doorframe 18/cutout 20. For example, the inner side 37 may be configured to cover the doorframe cutout 20 when the door 34 is configured in a closed position. The watertight door 34 may include a cavity 40 formed in the perimeter 36, where the cavity 40 may be any suitable shape. For example, the cavity 40 may be U-shaped and may be about 1 inch deep. The cavity 40 may include an opening 42 that may face out from the inner side 37 of the door.

The cavity 40 may include a gasket 44 disclosed inside of the cavity 40. The gasket 44 may correspond to the shape and/or size of the cavity 40 to allow the gasket to fit flush inside of the cavity 40. In some embodiments, the gasket 44 may extend around the entire door 34 around the perimeter portion 36 within the cavity 40, such as to facilitate a knife-edge seal system when the door 34 is in a closed position. The gasket 44 may be rubber. In some embodiments, the gasket 44 may be other material (e.g., plastic, polymer, etc.).

The door 34 can be selectively locked in the closed position by locking assemblies 64, which may include one or more dog lock fittings. The locking assembly 64 may be located at about the midway point along the front sidewall 10 closer to a longer edge of the front sidewall 10, such as near the handle 24. The locking assembly 64 (e.g., dog lock fitting) may include a bolt 66 extending through the door 34, where a first portion 70 of the bolt 66 may extend from the outer side 38 of the door 34 and a second portion 72 of the bolt 66 may extend from the inner side 37 of the door 34. The bolt 66 and (associated/attached components) may be rotatable about an axis 68 extending longitudinally through the bolt 66. In some embodiments, the rotation may be through an angle up to 360 degrees.

A first lever 74 may attach to the first portion 70 of the bolt 66. The locking assembly 64 may include a second lever 78 attached to the second portion 72 of the bolt 66. The second lever 78 may have a surface 76 that engages a sloped second side 52 of wedge 48 to tightly secure the door 34 to the doorframe 18 via the gasket 44 and knife edge 22 when the door is in closed and open positions. For example, responsive to transitioning from an open position to a closed position, the first surface 76 of the second lever 78 may initially engage with narrow portion 60 of the wedge 48 and slide along the sloped second side 52 of the wedge 48 to the thicker portion 62 of the wedge 48. The engagement of the first surface 76 of the second lever 78 and the sloped second side 52 of the wedge 48 provides a knife-edge seal via the gasket 44 and knife edge 22, which may transition the door 34 from an unlocked configuration to a locked configuration. For example, the gasket 44 may include a divot 46 sized and shaped to correspond a shape and a size of the knife edge 22 to accommodate the knife edge 22 when the door 34 is configured in the closed position. The dog (second lever 78) bears up tight on the wedge 48, causing the gasket 44 around the edge of the door 34 to press against the knife edge 22 around the doorframe 18 forming a watertight seal, such as when the one or more dogs are properly seated (i.e., dogged down). In some embodiments, the first surface 76 may include a projection (e.g., rubber, plastic, and the like) that may stick out and engage the wedge.

To transition from a closed position to an open position, the first surface 76 of the second lever 78 may slide down the sloped second side 52 of the wedge 48 from the thicker portion 62 to the narrow portion 60, which may transition the door 34 from a locked configuration to an unlocked configuration. In some embodiments, the first lever 74 and/or the second lever 78 may be unilateral levers having one arm, such as how the first lever 74 is shown in FIGS. 2 and 5. In some embodiments, the first lever 74 and/or the second lever 78 may be bilateral levers having a first arm 80 extending in a first lateral direction from the bolt 66 and a second arm 82 extending in a second lateral direction from the bolt 66, such as how the second lever 78 is shown in FIGS. 2 and 5. The second lateral direction may be opposite the first lateral direction. The levers 74, 78 may include more than two arms in some cases.

According to features described herein, dimensions are approximate and may be scaled to size based on desired sizing and scaling.

The term "about" as used herein will typically mean a numerical value which is approximate and whose small variation would not significantly affect the practice of the disclosed embodiments. Where a numerical limitation is used, unless indicated otherwise by the context, "about" means the numerical value can vary by +/−20%. Similarly, the term "substantially" will typically mean at least 85% to 99% of the characteristic modified by the term. For example, "substantially all" will mean at least 85%.

While preferred embodiments of the disclosure have been described, it is to be understood that the embodiments described are illustrative only and that the scope of the disclosure is to be defined solely by the appended claims when accorded a full range of equivalence, many variations and modifications naturally occurring to those skilled in the art from a perusal hereof

What is claimed is:

1. A portable assembly for housing a toilet, comprising:
   an enclosure comprising a right sidewall, a left sidewall, a front sidewall, a rear sidewall, and a top sidewall, the front sidewall having a doorframe cutout having a first perimeter portion formed around the doorframe cutout, wherein the first perimeter portion comprises a knife edge flange extending out from an outer side of the front sidewall;
   a base assembly, wherein the base assembly is coupled to the right sidewall, a left sidewall, a front sidewall, and a rear sidewall;
   a door having a second perimeter being sized and shaped to substantially cover an area of the doorframe cutout, the door having an inner side and an outer side, the second perimeter having a cavity formed in the second perimeter, wherein an opening of the cavity faces out from the inner side of the door, the inner side of the door being configured to substantially cover the doorframe cutout when the door is configured in a closed position;
   a gasket sized and shaped to substantially correspond to the shape and size of the cavity allowing the gasket to fit flush inside of the cavity, wherein the gasket comprises a divot sized and shaped to correspond to a shape and a size of the knife edge flange to accommodate the knife edge flange when the door is configured in the closed position;
   a wedge positioned on an inner side of the front sidewall, the wedge extending out from the inner side of the front sidewall; and
   a lock assembly attached to the door, the lock assembly comprising:
      a bolt extending through the door, wherein a first portion of the bolt extends from the outer side of the door and a second portion of the bolt extends from the inner side of the door, the bolt being rotatable about an axis;
      a first lever attached to the first portion of the bolt and configured to rotate about the axis; and
      a second lever attached to the second portion of the bolt, the second lever having a first surface configured to rotate about the axis to engage a sloped second side of the wedge for configuring the door in the closed position, wherein the second lever engages a thicker portion of the wedge in the closed position, wherein the engagement of the first surface of the second lever and the sloped second side of the wedge provides a knife-edge flange seal via the gasket and knife edge flange.

2. The portable assembly of claim 1, further comprising a hinge coupling an edge of the door to the front sidewall of the enclosure, wherein the door is configured to swing about the hinge.

3. The portable assembly of claim 1, wherein a narrow portion of the wedge is oriented spatially closer to the base assembly than the thicker portion of the wedge.

4. The portable assembly of claim 1, wherein the thicker portion of the wedge is oriented spatially closer to the base assembly than a narrow portion of the wedge.

5. The portable assembly of claim 1, wherein responsive to transitioning from an open position to the closed position, the first surface of the second lever initially engages with a narrow portion of the wedge and slides along the sloped second side of the wedge to the thicker portion of the wedge.

6. The portable assembly of claim 1, wherein the second lever is a bilateral lever having a first arm extending in a first lateral direction from the bolt and a second arm extending in a second lateral direction from the bolt.

7. The portable assembly of claim 6, wherein the second lateral direction is substantially opposite to the first lateral direction.

8. The portable assembly of claim 1, further comprising a toilet disposed on a top side of the base assembly and within the enclosure.

9. The portable assembly of claim 1, wherein the gasket is rubber.

10. The portable assembly of claim 1, wherein the wedge is integrally formed with the inner side of the front sidewall of the enclosure.

11. The portable assembly of claim 1, wherein the gasket extends around the entire second perimeter.

12. The portable assembly of claim 1, further comprising one or more hooking devices attached to the enclosure.

13. The portable assembly of claim 12, wherein the one or more hooking devices is attached to the top sidewall.

14. The portable assembly of claim 12, wherein each of the hooking devices comprises pad eyes.

15. The portable assembly of claim 12, wherein the one or more hooking devices comprises four hooking devices located at top corners of the enclosure.

16. The portable assembly of claim 1, wherein the base assembly is integrally formed with the enclosure.

17. The portable assembly of claim 16, wherein the base assembly forms a floor of the enclosure.

18. The portable assembly of claim 16, wherein the base assembly extends beyond a length of enclosure.

19. The portable assembly of claim 1, wherein the base assembly comprises one or more pocket channels, each pocket channel having at least one open end.

20. The portable assembly of claim 19, wherein each pocket channel comprises two open ends.

21. The portable assembly of claim 20, wherein each pocket channel includes an opening extending an entire length of the corresponding pocket channel between the two open ends.

22. The portable assembly of claim 19, wherein the one or more pocket channels comprises two pocket channels.

23. The portable assembly of claim 22, wherein an outer edge of a first of the two pocket channels is substantially aligned with an outer edge of the right sidewall, and an outer edge of a second of the two pocket channels is substantially aligned with an outer edge of the left sidewall.

24. The portable assembly of claim 22, wherein an outer edge of a first of the two pocket channels is substantially aligned with an outer edge of the front sidewall, and an outer edge of a second of the two pocket channels is substantially aligned with an outer edge of the rear sidewall.

25. The portable assembly of claim 1, wherein junctions between adjacent sidewalls of the enclosure form substantially 90 degree angles.

26. The portable assembly of claim 1, wherein the knife-edge flange seal is a water-tight seal.

27. The portable assembly of claim 1, wherein an angle formed between the first side of the wedge and the sloped second side of the wedge is between about 5 to 15 degrees.

28. A portable assembly for housing a toilet, comprising:
an enclosure including a front sidewall having a doorframe with a cutout;
a door sized and shaped to cover the cutout of the doorframe, the door having an inner side and an outer side;
a seal assembly positioned between the doorframe and the inner side of the door, the seal assembly including (i) a knife edge flange extending from a first perimeter of the doorframe (ii) a cavity formed in the inner side of the door, the cavity corresponding in shape to the first perimeter, and (iii) a gasket sized and shaped to substantially correspond to the shape and size of the cavity allowing the gasket to fit inside of the cavity, wherein the gasket comprises a divot sized and shaped to correspond a shape and a size of the knife edge flange to accommodate the knife edge flange when the door is configured in a closed position; and
a lock assembly attached to the portable assembly, the lock assembly including (i) a wedge positioned on the front sidewall, (ii) first and second levers attached to the door, (iii) wherein the second lever has a first surface configured to engage a sloped side of the wedge for configuring the door in the closed position, (iv) wherein the second lever engages a thicker portion of the wedge in the closed position, and (v) wherein the engagement of the first surface of the second lever and the sloped side of the wedge provides a knife edge flange seal via the gasket and knife edge flange.

* * * * *